United States Patent Office 3,294,635
Patented Dec. 27, 1966

3,294,635
3,4-DIHYDRO-BENZOXAZINONES-(1,3,2) AS AN ANALGESIC AGENT
Jan Thesing, Erwin Gams, Karl Schulte, and Siegmund Sommer, all of Darmstadt, Germany, assignors to E. Merck, Darmstadt, Germany
No Drawing. Filed Sept. 23, 1963, Ser. No. 316,480
Claims priority, application Germany, Sept. 26, 1962, M 54,317
3 Claims. (Cl. 167—52)

This invention relates to novel analgesic compositions based on 3,4-dihydro-benzoxazinones-(1,3,2).

The compound 3,4-dihydro-benzoxazinone-(1,3,2) and derivatives thereof have interesting pharmacological properties, particularly as analgesics and muscle relaxants.

For example, 3,4-dihydro-benzoxazinone-(1,3,2) by peroral administration in the "writhing test" on mice (Proc. Sec. Exper. Biol., 95, 729 (1957)) has 1.4 times the effectiveness of phenacetin; whereas, in the "hot plate test" on mice (Jr. of Pharmacology and Experimental Therapeutics, 98, 121 (1950)) after 30 minutes it has 2.4 times and after 60 minutes 2.7 times the effectiveness of phenacetin. Furthermore, in the central nervous system screening test on mice (Arch. Int. Pharmacodyn., 118, 358 (1959)) the same compound produces a muscular relaxation about twice as great as that of N-isopropyl-2-methyl-2-n-propyl-propanediol-dicarbamate. Still further, in experiments with cats, a methemoglobin-forming effect of the 3,4-dihydrobenzoxazinone-(1,3,2) cannot be shown, although phenacetin in about the same doses does lead to the familiar methemoglobin formation. Lastly, from the toxicity standpoint, with rats, an LD 50 of 1.05 g./kg. per os of 3,4-dihydro-benzoxazinone-(1,3,2) is only moderately toxic according to the classification of Hodge Sterner (Am. Ind. Hyg. Assoc. Quart., 10, 4 (1949)), while the LD 50 of phenacetin with rats amounts to 1.65 g./kg. per os ±0.35 (Toxicol. and Appl. Pharmacol., 1, 240 (1959)).

For the production of such a compound, however, no satisfactory process is known. The production of the base compound, 3,4 - dihydro - benzoxazinone - (1,3,2) (Liebigs Annalen, 464, 247 (1928)), or the corresponding 4-phenyl-derivatives (Journal fuer praktische Chemie, 147, 145 (1937)) results from a series of steps beginning with benzofuranone-(2) or 3-phenyl-benzofuranone-(2). Because of the difficulty of obtaining the starting materials, such methods of production are of no practical value. Another compound of this series, the 3,4-dihydro-6,8-dimethyl-benzoxazinone-(1,3,2) was obtained by a different but still inconvenient and uneconomical procedure from 2-hydroxy-3,5-dimethyl-benzyl alcohol (Kunststofftechnik, 12, 84 (1942)).

An object of this invention, therefore, is to provide an improved process for the production of 3,4-dihydrobenzoxazinone-(1,3,2) and derivatives thereof.

Another object is to provide novel and unobvious intermediates for the production of said 3,4-dihydrobenzoxazinones-(1,3,2).

A further object is to provide novel and unobvious derivatives of 3,4-dihydro-benzoxazinone-(1,3,2).

A still further object is to provide novel and unobvious analgesic compositions based on 3,4-dihydrobenzoxazinones-(1,3,2).

Yet another object is to provide a process for effecting analgesic activity in mammals by administering 3,4-dihydro-benzoxazinones-(1,3,2).

Upon further study of the specification and claims other objects and advantages of the present invention will become apparent.

The improved process of this invention comprises reacting a salt of cyanic acid, which salt may be produced in situ, with 2-hydroxy-benzyl halide of the Formula II

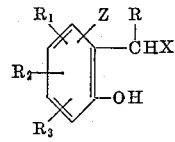

wherein

R represents hydrogen, methyl or ethyl;
X represents chlorine, bromine or iodine;
Z represent chlorine, bromine or a nitro radical; and
$R_1$, $R_2$ and $R_3$ represent hydrogen, chlorine, bromine, methyl, chloromethyl or nitro, $R_1$, $R_2$ and $R_3$ being, of course, the same or different, thereby forming halogen- or nitro-substituted 3,4-dihydro-benzoxazinone-(1,3,2) of the formula:

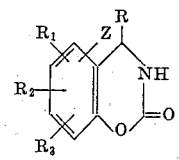

wherein Z, R, $R_1$, $R_2$ and $R_3$ have the previously indicated meanings.

The thus produced compounds can then be reacted with reducing agents to obtain 3,4-dihydro-benzoxazinones (1,3,2) of the Formula I, as follows:

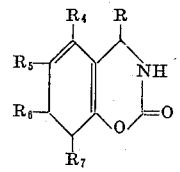

wherein

R represents hydrogen, methyl or ethyl, and
$R_4$, $R_5$, $R_6$ and $R_7$ represent any of hydrogen, chlorine, bromine, methyl, chloromethyl, nitro or amino.

This new synthesis for the ring system of the 3,4-dihydro-benzoxazinones-(1,3,2) can generally be performed without difficulty, so that this interesting class of compounds is for the first time made readily accessible by this invention.

Any of the salts of cyanic acid, and especially the alkali and alkaline earth salts can be used for this purpose. For example, potassium cyanate is very suitable. The reaction is advantageously conducted in a solvent. Suitable solvents are, among others, dimethyl-formamide or mixtures of water and acetone, dioxane, tetrahydrofuran, dimethyl-formamide or glycol ethers, as well as such two-phase systems as water/benzene and water/ether. The reaction occurs under mild conditions, being preferably conducted at room temperature with a reaction time of 1 to 4 hours. If the mixture is warmed, much less time will be required. The yields are excellent.

The effective closing of the ring under such mild conditions is unexpected because the compounds of Formula II are generally converted by alkalies completely into the corresponding quinone-methides. For example, this is the case when under similar conditions the cyanate is substituted by sodium carbonate or hydroxide solution. Since aqueous solutions of alkali and alkaline earth cyanates as a result of hydrolysis have a strongly alkaline reaction, it would be expected that under the conditions of the reaction there would likewise be the formation of quinone methides, or that the ring-closing reaction would be prevented or at least be greatly interfered with by quinone-methide formation. Evidently, the reason why the ring closing reaction occurs so smoothly is because it occurs more rapidly than the quinone-methide formation. Considering the fact that the quinone-methide formation occurs with the speed of an ionic reaction, the high yield of ring formation of the present reaction is indeed surprising.

It is to be noted, moreover, that the reaction of the 2-hydroxy-benzyl-halide of Formula II ocurs with cyanates only in cases where the aromatic nucleus of Formula II carries at least one electronegative substituent. If the nucleus does not contain an electronegative substituent, the quinone-methide is formed in high yield.

For example, 3,5-dimethyl-2-hydroxy-benzyl-chloride under the above conditions will produce a 70% yield of the corresponding quinone-methide.

As electronegative substituents, Cl, Br or $NO_2$ groups can be used. The aromatic nucleus may also contain other substituents, e.g. one or more halogen atoms or nitro groups, also methyl and/or chlorinated methyl groups, such as monochloromethyl, bichloromethyl, and trichloromethyl.

The 2-hydroxy-benzyl-halides which are used as starting materials can be produced by known methods. For example, the corresopnding 2-hydroxy-toluenes can be halogenated in the side chain, or the corresponding 2-hydroxy-benzyl-alcohols can be treated with a hydrohalide or with an inorganic acid-halide, e.g., thionyl chloride. In some cases it is also possible to chloromethylate phenols in the ortho-position.

The preferred novel 2-hydroxy-benzyl-halides of this invention are:

5-chloro-2-hydroxybenzyl-chloride
5-chloro-2-hydroxybenzyl-bromide
5-chloro-2-hydroxybenzyl-iodide
5-bromo-2-hydroxybenzyl-chloride
5-bromo-2-hydroxybenzyl-iodide
3,5-dichloro-2-hydroxybenzyl-bromide
3,5-dibromo-2-hydroxybenzyl-chloride
3-bromo-5-chloro-2-hydroxybenzyl-chloride
5-bromo-3-chloro-2-hydroxybenzyl-chloride
6-bromo-3,5-dichloro-2-hydroxybenzyl-chloride
3,4,6-trichloro-2-hydroxybenzyl-chloride
3,4,5,6-tetrachloro-2-hydroxybenzyl-chloride
4,6-dibromo-3,5-dichloro-2-hydroxybenzyl-chloride
3,4,5-trichloro-2-hydroxybenzyl-chloride
3,5,6-tribromo-4-chloro-2-hydroxybenzyl-bromide
3,4,5-tribromo-2-hydroxybenzyl-bromide
4,6-dibromo-2-hydroxy-3,5-dimethylbenzyl-chloride
3-chloro-2-hydroxy-5-methylbenzyl-chloride
3-bromo-2-hydroxy-5-methylbenzyl-bromide
5-chloro-2-hydroxy-3-methylbenzyl-chloride
5-bromo-2-hydroxy-3-methylbenzyl-bromide
5-bromo-2-hydroxy-6-methylbenzyl-bromide
3,5-dibromo-2-hydroxy-6-methylbenzyl-bromide
5-bromo-2-hydroxy-4-methylbenzyl-bromide
3,5-dibromo-2-hydroxy-4-methylbenzyl-bromide
4-bromo-2-hydroxy-3,5,6-trimethylbenzyl-bromide
1-(3,5-dichloro-2-hydroxyphenyl)-1-chloro-ethane
1-(3,5-dibromo-2-hydroxyphenyl)-1-bromo-ethane
1-(3,5-dichloro-2-hydroxyphenyl)-1-chloro-propane
1-(3,5-dibromo-2-hydroxyphenyl)-1-bromo-propane
5-chloro-2-hydroxy-3-nitrobenzyl-chloride
5-bromo-2-hydroxy-3-nitrobenzyl-bromide
3-chloro-2-hydroxy-5-nitrobenzyl-chloride
3-bromo-2-hydroxy-5-nitrobenzyl-bromide.

The salt of cyanic acid which is necessary for this reaction can be replaced by materials which will form a cyanate in situ. For example, it is possible to use for this purpose a cyanide in the presence of an oxidizing agent; or urea and an alkali. When methods like these are used, the conditions should be such that quinone-methide formation either does not occur at all or is reduced to a minimum.

The preferred novel chloro, bromo or nitro substituted 3,4-dihydro-benzoxazinones-(1,3,2) are:

6-chloro-3,4-dihydro-benzoxazinone-(1,3,2)
6-bromo-3,4-dihydro-benzoxazinone-(1,3,2)
6,8-dichloro-3,4-dihydro-benzoxazinone-(1,3,2)
6,8-dibromo-3,4-dihydro-benzoxazinone-(1,3,2)
8-bromo-6-chloro-3,4-dihydro-benzoxazinone-(1,3,2)
6-bromo-8-chloro-3,4-dihydro-benzoxazinone-(1,3,2)
5-bromo-6,8-dichloro-3,4-dihydro-benzoxazinone-(1,3,2)
5,7,8-trichloro-3,4-dihydro-benzoxazinone-(1,3,2)
5,6,7,8-tetrachloro-3,4-dihydro-benzoxazinone-(1,3,2)
5,7-dibromo-6,8-dichloro-3,4-dihydro-benzoxazinone-(1,3,2)
6,7,8-trichloro-3,4-dihydro-benzoxazinone-(1,3,2)
5,6,8-tribromo-7-chloro-3,4-dihydro-benzoxazinone-(1,3,2)
6,7,8-tribromo-3,4-dihydro-benzoxazinone-(1,3,2)
5,7-dibromo-6,8-dimethyl-3,4-dihydro-benzoxazinone-(1,3,2)
6,8-dichloro-4-methyl-3,4-dihydro-benzoxazinone-(1,3,2)
6,8-dichloro-4-ethyl-3,4-dihydro-benzoxazinone-(1,3,2)
6,8-dibromo-4-methyl-3,4-dihydro-benzoxazinone-(1,3,2)
6,8-dibromo-4-ethyl-3,4-dihydro-benzoxazinone-(1,3,2)
8-chloro-6-methyl-3,4-dihydro-benzoxazinone-(1,3,2)
8-bromo-6-methyl-3,4-dihydro-benzoxazinone-(1,3,2)
6-chloro-8-methyl-3,4-dihydro-benzoxazinone-(1,3,2)
6-bromo-8-methyl-3,4-dihydro-benzoxazinone-(1,3,2)
6-bromo-5-methyl-3,4-dihydro-benzoxazinone-(1,3,2)
6,8-dibromo-5-methyl-3,4-dihydro-benzoxazinone-(1,3,2)
6-bromo-7-methyl-3,4-dihydro-benzoxazinone-(1,3,2)
6,8-dibromo-7-methyl-3,4-dihydro-benzoxazinone-(1,3,2)
7-bromo-5,6,8-trimethyl-3,4-dihydro-benzoxazinone-(1,3,2)
6-nitro-3,4-dihydro-benzoxazinone-(1,3,2)
6-chloro-8-nitro-3,4-dihydro-benzoxazinone-(1,3,2)
6-bromo-8-nitro-3,4-dihydro-benzoxazinone-(1,3,2)
8-chloro-6-nitro-3,4-dihydro-benzoxazinone-(1,3,2)
8-bromo-6-nitro-3,4-dihydro-benzoxazinone-(1,3,2)
6-chloro-8-chloromethyl-3,4-dihydro-benzoxazinone-(1,3,2)

By another feature of this invention it is also possible to produce those 3,4-dihydro-benzoxazinones-(1,3,2) in which the aromatic ring does not carry electronegative substituents, e.g., the first member of the series 3,4-dihydro-benzoxazinone-(1,3,2) itself. The starting material will then be a compound of Formula I with one or more Cl or Br atoms as substituents in the aromatic nucleus, which is then hydrogenated catalytically so as to substitute the halogens by hydrogen. For this reaction, any conventional hydrogenation catalyst is useful, e.g., platinum oxide or palladium on a suitable carrier. The reaction can be performed either with or without pressure, and will occur at room temperature, but more rapidly if the solution is warmed. Any of the solvents that are suitable for hydrogenation reactions can be used, e.g., methanol, ethanol, ethyl acetate, dioxane or glacial acetic acid. During such hydrogenation the nitro groups on the aromatic nucleus can also be converted into amino groups. The nitro groups can also be reduced by known chemical methods, as by metals such as iron or zinc.

The novel 3,4-dihydro-benzoxazinones-(1,3,2) of this invention are represented by Formula I wherein at least one of R, $R_4$, $R_5$, $R_6$ and $R_7$ is other than hydrogen, and when R, $R_4$, and $R_6$ are hydrogen, that $R_5$ and $R_7$ are not simultaneously methyl. Particularly unobvious compounds are those with at least two of R, $R_4$, $R_5$, $R_6$ and $R_7$ are other than hydrogen, and if $R_5$ and/or $R_7$ is methyl, one of R, $R_4$, $R_5$, $R_6$ and $R_7$ is other than hydrogen and methyl or ethyl. Preferred novel species include:

4-methyl-3,4-dihydro-benzoxazinone-(1,3,2)
5-methyl-3,4-dihydro-benzoxazinone-(1,3,2)
6-methyl-3,4-dihydro-benzoxazinone-(1,3,2)
7-methyl-3,4-dihydro-benzoxazinone-(1,3,2)

8-methyl-3,4-dihydro-benzoxazinone-(1,3,2)
4,7-dimethyl-3,4-dihydro-benzoxazinone-(1,3,2)
4-ethyl-3,4-dihydro-benzoxazinone-(1,3,2)
5,6,8-trimethyl-3,4-dihydro-benzoxazinone-(1,3,2)
6-amino-3,4-dihydro-benzoxazinone-(1,3,2)
6-amino-8-chloro-3,4-dihydro-benzoxazinone-(1,3,2)
6-amino-8-bromo-3,4-dihydro-benzoxazinone-(1,3,2)
8-amino-6-chloro-3,4-dihydro-benzoxazinone-(1,3,2)
8-amino-6-bromo-3,4-dihydro-benzoxazinone-(1,3,2)

and those mentioned above.

The compounds produced according to this invention can be used as medicines in admixture with the usual pharmaceutical carriers. As carrier substances, use can be made of those organic and inorganic materials which are suitable for parenteral or enteral application and which do not react with the new compounds, as for example water, vegetable oils, polyethylene glycol, gelatin, lactose, starch, magnesium stearate, talcum, cholesterol, etc. For parenteral application, use is made especially of solutions, and preferably of oily or watery solutions, as well as suspensions, emulsions or implants. For enteral application, use can be made of tablets or dragees, which may, if necessary, be sterilized or mixed with excipients, such as preservatives, stabilizers or wetting agents or salts for influencing the osmotic pressure, or with buffers. The compounds are preferably used in a unit dosage of 50 to 500 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

26.60 g. 2-hydroxy-3,5-dichlorobenzyl-bromide are dissolved in 100 ml. acetone, and to it is then added drop-by-drop at a temperature between 10° and 20° C. within 15 to 20 minutes with constant stirring, a solution of 9.72 g. of potassium cyanate in 17 ml. water. A slightly yellow precipitate of 3,4-dihydro-6,8-dichloro-benzoxazinone-(1,3,2) immediately appears. The mixture is then stirred 2 to 4 hours at room temperature and the crystalline residue filtered off with suction. It is then washed with 50% acetone, stirred with 17 ml. water, again filtered with suction, and dried at 80° C. Yield 20.6 g. of the crude product. M.P. 246–248° C. After recrystallization from glacial acetic acid, 17.4 g. of the pure product is obtained. M.P. 257–258° C.

The starting material is obtained as follows—50 g. 2-hydroxy-3,5-dichlorotoluene are warmed to 120° C., 49.8 g. bromine added drop-by-drop and the stirring continued another 90 minutes. 65.9 g. crude rapidly crystallizing 2-hydroxy-3,5-dichlorobenzyl-bromide are obtained. M.P. 65–77° C. After 2 recrystallizations from petroleum ether, the melting point rises to 94–95° C.

Instead of the 2-hydroxy-3,5-dichlorobenzyl-bromide, it is also possible to use 21.15 g. 2-hydroxy-3,5-dichloro-benzyl-chloride, and instead of potassium cyanate some other salt of cyanic acid can be used, such as sodium, calcium or ammonium cyanate.

Example 2

21.15 g. 2-hydroxy-3,5-dichlorobenzyl-chloride or 26.60 g. 2-hydroxy-3,5-dichlorobenzyl-bromide are mixed with 9.72 g. potassium cyanate and 60 ml. dimethyl formamide and stirred 12 hours at 20° C. The mixture is then evaporated to dryness under vacuum and the residue recrystallized from glacial acetic acid, producing 8.0 g. 3,4-dihydro-6,8-dichloro-benzoxazinone-(1,3,2). M.P. 257–258° C.

Example 3

34.47 g. 2-hydroxy-3,5-dibromobenzyl-bromide are reacted with 9.72 g. potassium cyanate by analogy to Example 1, producing 27.6 g. crude 3,4-dihydro-6,8-dibromo-benzoxazinone-(1,3,2). M.P. 252° C. After recrystallization from glacial acetic acid, the pure compound melting at 258° C., is obtained.

Example 4

18.75 g. 2-hydroxy-5-nitrobenzyl-chloride are reacted with 9.72 g. potassium cyanate by analogy to Example 1, producing 17.5 g. of crude 3,4-dihydro-6-nitro-benzoxazinone-(1,3,2) melting at 238° C. After recrystallization from 50% aqueous alcohol or from dimethyl-formamide/water, the pure compound melting at 249° C. is obtained.

Example 5

26.58 g. 2-hydroxy-5-bromobenzyl-bromide are reacted with 9.72 g. potassium cyanate by analogy to Example 1, producing 20.0 g. of crude 3,4-dihydro-6-bromo-benzoxazinone-(1,3,2). M.P. 258–260° C. By recrystallization from alcohol or glacial acetic acid, the pure compound melting at 264–266° C. is obtained.

Example 6

37.7 g. 2 - hydroxy - 3,5 - dimethyl-4,6-dibromo-benzyl-bromide are reacted with 9.72 g. potassium cyanate by analogy to Example 1, producing 29.8 g. of crude 3,4-dihydro - 5,7 - dibromo - 6,8 - dimethyl - benzoxazinone-(1,3,2). M.P. 285–286° C. By recrystallization from glacial acetic acid, the pure compound melting at 303–304° C. is obtained.

In a similar manner it is possible from 2-hydroxy-5-chlorobenzyl-chloride to produce 3,4-dihydro-6-chloro-benzoxazinone-(1,3,2). M.P. 260–261° C. (sintering at 250° C.). From 2-hydroxy-5-bromobenzyl-bromide it is similarly possible to produce 3,4-dihydro-6-bromo-benzoxazinone-(1,3,2). M.P. 264–266° C.

Example 7

85.8 g. of crude 2-hydroxy-3-chloro-5-methyl-benzyl-chloride are reacted with 31.6 g. potassium cyanate by analogy to Example 1, producing 23.3 g. of crude 3,4-dihydro-6-methyl-8-chloro-benzoxazinone-(1,3,2). M.P. 140–150° C. After recrystallization from 2-ethoxy-ethanol the melting point rises to 193–194° C.

The starting material is obtained as follows—95.5 g. crude 2-hydroxy-3-chloro-5-methyl-benzyl-alcohol are dissolved in 250 ml. absolute benzene and 15 g. CaCl$_2$ added. Dry HCl is introduced to saturation while the solution is cooled and stirred. The reaction mixture is then filtered and evaporated to dryness under vacuum.

By analogy it is also possible from 2-hydroxy-3-methyl-5 - chloro - benzyl-alcohol, through 2-hydroxy-3-methyl-5-chloro-benzyl-chloride, to produce 3,4-dihydro-6-chloro-8-methyl-benzoxazinone-(1,3,2). M.P. 220–221° C.

Example 8

21.15 g. 2-hydroxy-3,5-dichloro-benzyl-chloride are dissolved in 100 ml. benzene (or in 100 ml. ether). During vigorous stirring, a solution of 9.72 g. potassium cyanate in 17 ml. water is added drop-by-drop within 10 to 20 minutes at 10 to 20° C. After continuing the stirring 2 to 4 hours, the material is filtered with suction, washed with water, and recrystallized from glacial acetic acid, producing 3,4 - dihydro - 6,8 - dichloro - benzoxazinone-(1,3,2). M.P. 258° C. Yield 12 g. of the crude product.

The corresponding 4-methyl and 4-ethyl derivatives can be obtained in a similar manner.

Example 9

(a) According to Example 1 or 2, 3,4-dihydro-6,8-dichloro-benzoxazinone-(1,3,2) is produced.

(b) 70 g. pure 3,4-dihydro-6,8-dichloro-benzoxazinone-(1,3,2) are hydrogenated in 700 ml. methanol at 45–50° C. with the addition of 27.3 g. 10% palladium/MgO catalyst for about 60–90 minutes. The theoretical amount of hydrogen is absorbed. The solution is filtered hot, cooled, and the precipitated crystals then filtered off with suction and stirred with 300 ml. water, obtaining a slightly yellow substance that melts at 188–189° C. After recrystallization from methanol and working up of all mother liquors, a total of 38.8 g. colorless pure 3,4-dihydro-benzoxazinone-(1,3,2) is obtained. M.P. 191.5–192.5° C.

By analogy the following products can be produced.

According to Example 7, the 3,4-dihydro-6-chloro-8-methyl-benzoxazinone-(1,3,2) and from that by hydrogenation the 3,4-dihydro-8-methyl-benzoxazinone-(1,3,2). M.P. 188–189° C.

According to Example 7, the 3,4-dihydro-6-methyl-8-chloro-benzoxazinone-(1,3,2) and from that by hydrogenation the 3,4-dihydro-6-methyl-benzoxazinone-(1,3,2). M.P. 231–232° C.

According to Example 6, the 3,4-dihydro-5,7-dibromo-6,8-dimethyl-benzoxazinone-(1,3,2) and from that by hydrogenation the 3,4-dihydro-6,8-dimethyl-benzoxazinone-(1,3,2). M.P. 183° C.

According to Example 8, the 3,4-dihydro-4-methyl-6-8-dichloro-benzoxazinone-(1,3,2) and from that by hydrogenation the 3,4-dihydro-4-methyl-benzoxazinone-(1,3,2). M.P. 100–102° C.

According to Example 8, the 3,4-dihydro-4-ethyl-6,8-dichloro-benzoxazinone-(1,3,2) and from that by hydrogenation the 3,4-dihydro-4-ethyl-benzoxazinone-(1,3,2). M.P. 118° C.

*Example 10*

(a) Analogous to Example 4, 3,4-dihydro-6-nitro-benzoxazinone-(1,3,2) is produced.

(b) 19.4 g. 3,4-dihydro-6-nitro-benzoxazinone-(1,3,2) are hydrogenated in 1 liter methanol at 30° C. with 7 g. 5% palladium/charcoal catalyst with the addition of 4.4 g. HCl gas for about 2 hours until shutdown. The theoretical amount of hydrogen is taken up. The material is filtered and evaporated to dryness under vacuum; the residue is dissolved in 100 ml. water, neutralized with a dilute soda solution, and the precipitated crystals are filtered off with suction. They decompose at 207–208° C. Yield 11.9 g. By recrystallization from methanol or ethanol, nearly colorless pure 3,4-dihydro-6-amino-benzoxazinone-(1,3,2) is obtained. It decomposes at 216° C.

*Example 11*

10 g. 2-hydroxy-3-chloro-methyl-5 - chloro-benzylchloride are reacted wtih 3.6 g. potassium cyanate by analogy to Example 1, producing 7.6 g. crude 3,4-dihydro-6-chloro-8 - chloromethyl-benzoxazinone-(1,3,2). M.P. 199–201° C. By recrystallization from ethanol, the pure compound is obtained. M.P. 213–214° C.

By hydrogenation of 35.4 g. of this compound by analogy to Example 9 or 10, 68% pure 3,4-dihydro-8-methylbenzoxazinone-(1,3,2) is obtained. M.P. 188–189° C.

*Example 12.—Tablets*

(a)

| | |
|---|---|
| 3,4-dihydro-benzoxazinone-(1,3,2) _____kg__ | 1.5 |
| Cornstarch _____g__ | 250 |
| Highly dispersed silicic acid _____g__ | 500 |

(b)

| | |
|---|---|
| Aqueous 4% gelatin _____ca. g__ | 200 |

(c)

| | |
|---|---|
| Talcum _____g__ | 230 |
| Magnesium stearate _____g__ | 20 |

(a) is granulated with (b), and after admixture of (c) is pressed into tablets. 10,000 tablets are obtained. Each tablet contains 150 mg. of the active substance. In general, the amount of pharmaceutical carrier per tablet will range from 20 to 500 mg.

Instead of the 3,4-dihydro-benzoxazinone-(1,3,2) one of its derivatives can be used, preferably the 4-methyl, 4-ethyl, 6-methyl, 8-methyl, 6,8-dimethyl or 6-amino derivative.

*Example 13.—Syrup*

| | G. |
|---|---|
| 3,4-dihydro-benzoxazinone-(1,3,2) _____ | 3 |
| Carboxymethyl cellulose _____ | 1 |
| Citric acid _____ | 1 |
| Hydroxybenzoic acid methyl ester _____ | 0.1 |
| Glycerine _____ | 2 |
| Saccharin _____ | 0.005 |
| Aroma, q.s. | |
| Water, ad 100 ml. | |

In each unit dosage of a teaspoon, there is about 150 mg. of the active analgesic ingredient.

In general, the amount of carrier employed per unit dosage is between 20 mg. and 5 g.

From the foregoing description, one skilled in the art can easily ascertain the essential characteristics of this invention, and without departing from the spirit and scope thereof, can make various changes and modifications of the invention to adapt it to various usages and conditions.

For example, it seems in fact possible to perform the process of this invention with arbitrarily substituted 2-hydroxy-benzyl-halides, provided the substituents are not such as will themselves react with salts of cyanic acid. Possible substituents that can be used are F, I, alkyl, aralkyl, aryl, alkoxy, aralkoxy, aryloxy, cyan, and dialkylamino groups. Such substituents can occur either in the aromatic nucleus or in the side chains. By reduction or hydrogenolysis, compounds with hydroxyl and/or amino alkyl groups are obtainable. To conduct the process of this invention with compounds containing such substituents would be equivalent to the claimed process.

Consequently, such changes and modifications are properly, equitably, and intended to be, within the full range of equivalence of the following claims.

What is claimed is:

1. A pharmaceutical composition for oral administration and effecting analgesic activity comprising about 50–500 mg. of 3,4-dihydro-benzoxazinone-(1,3,2) and a pharmaceutical carrier.

2. A pharmaceutical composition as defined by claim 1, said composition being in tablet form.

3. A process for effecting analgesic activity in mammals, which process comprises orally administering to mammals 50–500 mg. of 3,4-dihydro-benzoxazinone-(1,3,2).

References Cited by the Examiner

UNITED STATES PATENTS

| | | | |
|---|---|---|---|
| 2,139,550 | 12/1938 | Klarmann _____ | 260—623 |
| 2,478,093 | 8/1949 | Fishburn _____ | 167—52 |
| 2,489,423 | 11/1949 | Lawson _____ | 260—623 |
| 2,943,087 | 6/1960 | Ohnacker _____ | 260—244 |
| 2,975,097 | 3/1961 | Modderno _____ | 167—52 |
| 3,082,112 | 3/1963 | Hemwall _____ | 260—244 |
| 3,178,427 | 4/1965 | Gassmann _____ | 260—244 |

OTHER REFERENCES

Chemical Abstracts, 51–17926b (1957).

Chemical Abstracts 59: 2806e (1963) [Abstracting, Kurihara et al., Tohaku Yakka Daujaku Kiga 9, p. 69 to 75 (1962)].

Wiley, "Five and Six-Membered Compound With Nitrogen and Oxygen (Excluding Oxazoles)," Interscience Publishers, a division of John Wiley and Sons, New York (1962), pp. 357 and 359.

SAM ROSEN, *Primary Examiner.*

JULIAN S. LEVITT, *Examiner.*

J. D. GOLDBERG, *Assistant Examiner.*